United States Patent [19]

Van Tuyl

[11] 4,286,564

[45] Sep. 1, 1981

[54] SYSTEM FOR PREHEATING FUEL

[76] Inventor: Richard Van Tuyl, Rte. 1, Box 81, Pikeville, N.C. 27863

[21] Appl. No.: 96,536

[22] Filed: Nov. 21, 1979

[51] Int. Cl.³ .......................................... F02M 31/00
[52] U.S. Cl. .................................. 123/545; 123/557; 261/144
[58] Field of Search ............... 123/557, 545, 547, 554; 261/144, 145

[56] References Cited

U.S. PATENT DOCUMENTS

| 1,145,995 | 7/1915 | Johnson | 123/545 |
| 3,762,385 | 10/1973 | Hollnagel | 123/545 |

FOREIGN PATENT DOCUMENTS

| 116477 | 2/1943 | Australia | 261/144 |
| 240619 | 12/1959 | Australia | 261/144 |
| 800923 | 11/1950 | Fed. Rep. of Germany | 123/554 |

*Primary Examiner*—Ronald H. Lazarus

*Attorney, Agent, or Firm*—Mills and Coats

[57] ABSTRACT

The present invention relates to a system for preheating gas prior to entry into the carburetor and further preheating the air-fuel mixture passing from the carburetor into the intake manifold of the engine. In particular, the present invention entails a heat exchanger plate assembly disposed between the engine carburetor and the engine with openings provided therein for allowing the air-fuel mixture to pass therethrough. Additionally, the heat exchanger plate assembly includes a first compartment operatively connected to the engine cooling system and a second adjacent compartment operatively connected to the fuel supply line. The fuel is preheated by the exchange of heat between the first and second compartments, and further since the coolant fluid is circulated through the first compartment and the same is adjacent openings allowing the air-fuel mixture to pass from the carburetor to the engine, it follows that the air-fuel mixture itself is also heated by the heat exchanger plate assembly.

9 Claims, 4 Drawing Figures

SYSTEM FOR PREHEATING FUEL

BACKGROUND OF INVENTION

Over the past years, everyone has been made aware of the fact that our energy resources are limited and in some cases even scarce, and the fact that there is a great need to conserve energy. Nowhere has this been more dramatic and apparent than at gasoline service stations. The continuously rising cost of fuel and the scarcity that people have been exposed to, has made it very clear that there is a need to conserve fuel, and in the case of automobiles and other types of road vehicles, that there exists a need to develop more efficient operating engines.

Over the last few years, there has been a great deal of research and development work in the area of attempting to make internal combustion engines more efficient, or expressed in another way to achieve better gasoline mileage. The range of this work has been very extensive, but one area that has gained a great deal of attention is the area of attempting to preheat the gasoline prior to combustion in order to make greater use of the gasoline consumed.

While certain devices have been known and provided in the prior art for heating gasoline prior to a combustion, many such devices have not been practical and economical. In this regard, some have been very complex and expensive, and even some have not really effectively heated the gasoline prior to induction into the associated engine.

Consequently, there exists a need for a device or system that will effectively heat gasoline or fuel prior to its induction into an engine, and which is practical, easy to install and maintain, and which is relatively inexpensive.

SUMMARY OF INVENTION

The present invention relates to a device that is adapted to be used in conjunction with an engine for heating fuel effectively and efficiently prior to its induction into the combustion chamber of the associated engine. This device makes up a total system for heating gasoline prior to it reaching the combustion chambers of the engine.

More particularly, the present invention entails a heat exchanger plate assembly that is adapted to be mounted between an engine carburetor and the intake manifold of the engine and which is provided with at least two compartments, one compartment for receiving coolant fluid from the cooling system of the engine and the other compartment for receiving gas prior to the gas being directed to the engine carburetor. The coolant fluid flowing through the first compartment acts to transfer heat therefrom to the gas line passing through the other compartment such that the gasoline or fuel is heated prior to reaching the carburetor.

In addition, the heat exchanger plate assembly is provided with opening means for allowing the air-fuel mixture passing from the carburetor to pass therethrough into the intake manifold of the engine. The opening means is provided within the heat exchanger plate assembly interiorly of the compartments and generally adjacent the compartment for receiving the coolant fluid such that the air-fuel mixture is heated itself. This is even after the fuel or gasoline has been heated by the same heat exchanger plate assembly prior to being received by the carburetor.

In addition, the heat exchanger plate assembly is provided with baffle means that stretch across said opening means therein for breaking up gasoline particles passing downwardly therethrough. Of particular significance is the fact that the baffle plates are mounted for vibratory motion such that they vibrate in response to a vacuum produced by the engine.

It is, therefore, an object of the present invention to provide a system and device that will effectively and efficiently heat fuel prior to the fuel reaching the combustion chambers of the engine.

A further object of the present invention resides in the provision of the system and device therefor for heating fuel prior to the same reaching the combustion chambers of an engine that is simple, easy to install and maintain, and which is relatively inexpensive.

Another object of the present invention is to provide a system for heating fuel prior to combustion wherein the same device heats the fuel prior to entry into and through the carburetor and further heats the resulting air-fuel mixture passing from the carburetor.

Yet another object of the present invention is to provide a system for conditioning fuel or gasoline prior to combustion that is provided with a series of baffles for breaking up the gasoline particles prior to entry into the combustion chamber.

Another object of the present invention is to provide a fuel conditioning system of the character described above wherein the baffle plates are movably mounted such that they may vibrate in response to a vacuum being pulled thereagainst.

Finally it is an object of the present invention to provide a heat exchanger plate assembly that is adapted to fit between the engine carburetor and the intake manifold of the engine and which is provided with two adjacent compartments, one for receiving coolant fluid from the cooling system of the engine and another for receiving fuel being directed to the carburetor, whereby the continuous flow of coolant fluid through one compartment and the continuous flow of gas or fuel through the other compartment gives rise to a heat exchange relationship where heat from the coolant fluid is transferred to the adjacent passing gas so as to heat the same prior to reaching the carburetor; and wherein the same heat exchanger plate assembly is provided with opening means disposed generally adjacent the first compartment where coolant fluid is passing therethrough such that the air-fuel mixture passing down through the opening means is also heated by the heat exchanger plate assembly.

Other objects and advantages of the present invention will become apparent from a study of the following description and the accompanying drawings which are merely illustrative of the present invention.

DESCRIPTION OF PREFERRED EMBODIMENT

Figure 1:
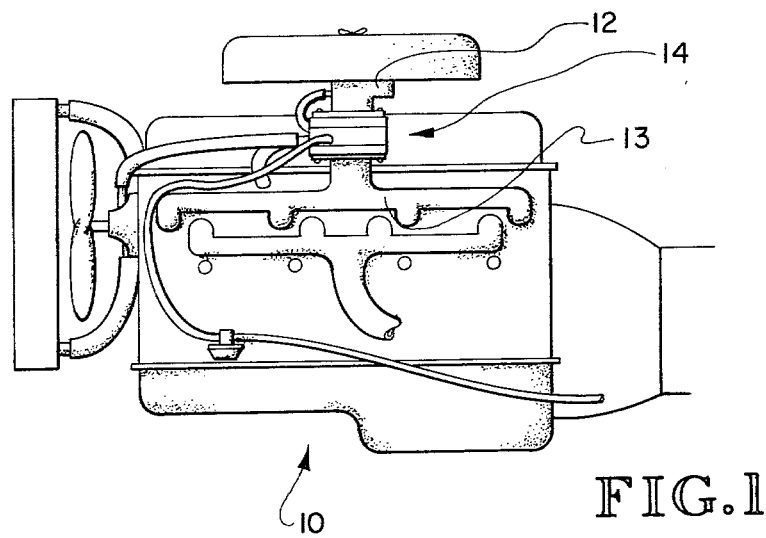
FIG. 1 illustrates the present invention installed on an engine.
Figure 2:
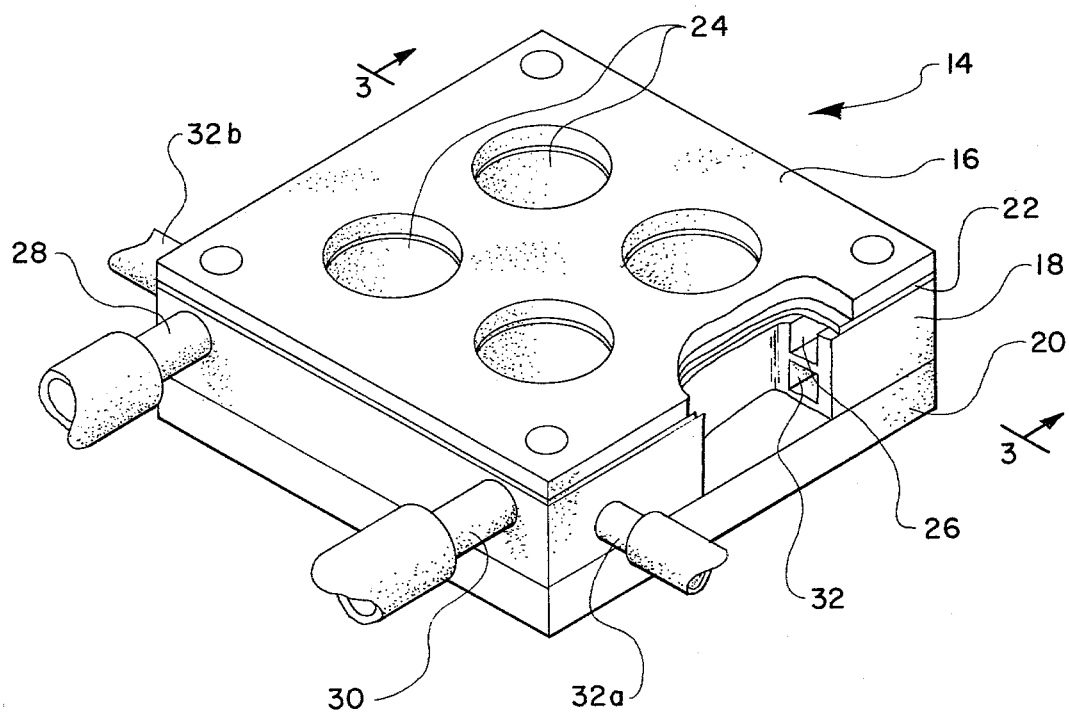
FIG. 2 is a perspective view of the heat exchanger plate assembly of the present invention.
Figure 3:
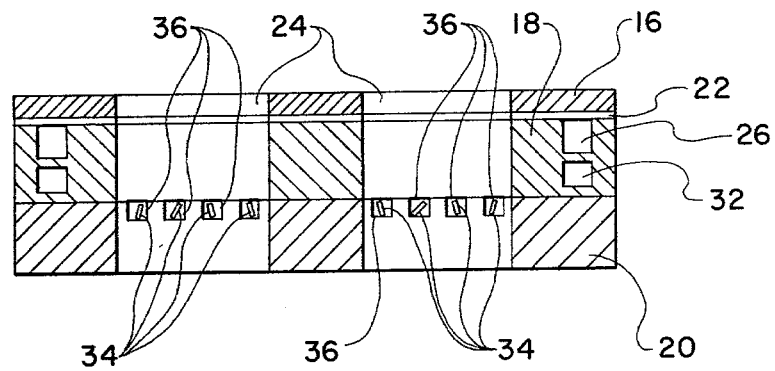
FIG. 3 is a sectional view taken through the lines 3—3 in FIG. 2.

With further reference to the drawings, the system for preheating fuel or gasoline prior to entry into the combustion chambers of an engine is shown therein. The system is designed and adapted to be used in conjunction with an engine indicated generally by the numeral 10 which would typically be a piston type internal combustion engine. Details of the engine 10 will not be dealt with herein in specifics because such is well known and appreciated by those skilled in the art and further such is not material per se to the present invention. But for a general understanding of the present invention suffice it to say that the engine 10 would include a carburetor 12, an intake manifold 13 and would further include a fluid cooling system for circulating water or a coolant fluid through the engine during operation. In addition the engine would further be provided with a fuel pump for directing gas through a supply line to the carburetor 12.

Turning specifically to the present invention, the same comprises a heat exchanger plate assembly indicated generally by the numeral 14 that is adapted to be connected between the carburetor 12 and the intake manifold 13 of the engine 10. Viewing the heat exchanger plate assembly 14 in detail, the same is comprised of a top plate 16 secured to a main intermediate plate 18 with a gasket 22 being disposed therebetween. Secured to the lower side of the main plate 18 is a lower plate 20. Typically the three plates 16, 18 and 20 would be secured together by bolts or other suitable securing means.

Each of the plates is provided with opening means 24 formed generally centrally therein for allowing the air-fuel mixture passing from the carburetor 12 to pass therethrough into the intake manifold. The opening means 24 of each plate, which may be one opening or a plurality of openings are aligned such that the opening or openings form respective barrel type channels from the top plate 16 through the bottom or lower plate 20.

Viewing the main exchanger plate 18 in detail, the same comprises a first compartment 26 generally open about the top thereof and formed around the side wall structure thereof. It is appreciated that the first compartment extends generally around the rectangularly shaped main plate and is disposed exteriorly of the opening means 24 formed therein. The first compartment 26 is designed to receive the coolant fluid from the engine cooling system and is accordingly provided with an inlet 28 and an outlet 30, with the inlet being adapted to connect to the hot coolant line leaving the engine and with the outlet line being appropriately connected such that the coolant fluid is circulated through the first compartment 26 of the main plate as the engine operates.

A second compartment 32 is formed adjacent the first compartment 26 in the main plate and generally extends around the main plate 18 directly adjacent the first compartment. More particularly, the second compartment 32 extends around the outside of the main plate 18 inside of the exterior side wall thereof but exteriorly of the opening means 24 formed therein. Second compartment 32 is provided with an inlet coupling 32a and an outlet coupling 32b with the respective couplings being adapted to be connected into the gas supply line leading from the fuel pump to the carburetor 12. This means that gasoline or fuel being pumped by the fuel pump is directed into the inlet 32a and through the second compartment 32 and out the outlet 32b thereof into the carburetor 12.

Consequently because the first and second compartments 26 and 32 are disposed directly adjacent each other in heat exchange relationship, it follows that heat from the coolant fluid passing through the first compartment 26 is transferred through the wall structure separating the first and second compartments through the second compartment and to the gasoline passing therethrough so as to heat the same. As a practical matter, the inlet and outlet couplings to the first and second compartments are so designed such that the coolant fluid circulating through the first compartment runs counter to the gasoline or fuel passing through the second chamber so as to improve the efficiency of the heat exchanger.

Within the lower plate 20, there is provided a series of laterally spaced apart elongated baffles 34 that extend across the opening means 24 formed therein. The baffles 34 serve to break up the gasoline particles forming a part of the air-fuel mixture passing therethrough and therefore to improve the condition of the air-fuel mixture for combustion purposes. Baffles 34 are movably mounted across the opening means 24 in the lower plate 20 by a series of rectangular slots 36 provided in the lower plate 20 adjacent the opening means 24. The rectangular slots 36 are designed to support the respective baffles 34 such that they move therein. The baffles 34 are supported by the lower edge of the respective rectangular slots 36 but yet when the engine vacuum is applied thereagainst, the respective baffles 34 can then vibrate and consequently more effectively and efficiently break up the fuel particles forming a part of the air-fuel mixture passing thereby.

Figure 4:
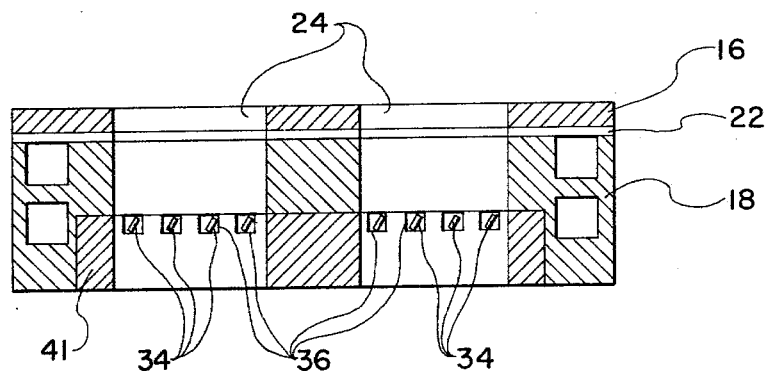
FIG. 4 is a sectional view similar to FIG. 3 of an alternate design.

In FIG. 4, there is shown an alternate design. In this alternate design, the lower plate becomes an insert indicated by the numeral 41 and the center plate 18 is designed to receive the same, as illustrated in FIG. 4. Insert 41 includes the series of baffles 34 held within the rectangular slots 36. The baffles 34 function in the same manner as described hereinabove.

It is, therefore, appreciated from the foregoing specification that the present invention presents a practical and economical system for heating fuel and conditioning the fuel for more efficient combustion prior to the fuel reaching the combustion chambers of the engine 10. It will be appreciated that this will give rise to a cleaner buring engine and a more efficient engine inasmuch as the system of the present invention should increase the gasoline mileage of the engine and the vehicle having the engine mounted therein.

The terms "upper", "lower", "forward", "rearward", etc., have been used herein merely for the convenience of the foregoing specification and in the appended claims to describe fuel heating system and its parts as oriented in the drawings. It is to be understood, however, that these terms are in no way limiting to the invention since the fuel heating system may obviously be disposed in many differnt positions when in actual use.

The present invention, of coure, may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A system for improving performance and fuel economy of an internal combustion engine having a carburetor for directing an air-fuel mixture to the engine, a fluid cooling system for cooling said engine, and a fuel supply line for directing fuel from the fuel pump to said carburetor, said system comprising: a heat exchanger plate assembly mounted between; said engine and said carburetor and including opening means therein for allowing the air-fuel mixture from the carburetor to pass therethrough into the engine; said heat exchanger plate assembly having a wall extending generally around said opening means; a first compartment formed in said exchanger plate assembly and disposed generally exteriorly of said opening means and extending therearound, said first compartment having an inlet and an outlet operatively connected to said engine cooling system for circulating relatively hot coolant fluid through said first compartment, thereby transferring heat from the engine coolant fluid to the exchanger plate assembly and to the air-fuel mixture passing through said opening means formed within said exchanger plate assembly; a second compartment formed in said exchanger plate assembly generally exterior of said opening means and which generally extends around said opening means; said second compartment lying adjacent said first compartment such that heat associated with the coolant fluid passing therethrough may be readily transferred to said second compartment; inlet and outlet means associated with said second compartment and operatively connected to said fuel line for routing fuel through said secondcompartment prior to its entry into said carburetor such that heat associated with said engine coolant fluid passing in said first compartment may be transferred to the gas being routed through said second compartment, whereby the heat from said engine coolant fluid acts to not only heat the gas prior to entry into the carburetor but also heats the final air-fuel mixture passing from the carburetor.

2. The system of claim 1 wherein there is provided baffle means disposed below said carburetor and in the path of the air-fuel mixture for breaking up and dispersing gas particles prior to entry into said engine.

3. The system of claim 2 wherein said baffle means comprises a plurality of laterally spaced baffles and wherein there is provided mounting means for mounting said plurality of baffles for movement such that they will vibrate in response to a vacuum pulled by said engine.

4. The system of claim 3 wherein said plurality of baffles is disposed transversely across said opening means formed within said heat exchanger plate assembly.

5. The system of claim 4 wherein said inlet and outlet of said first and second compartments are arranged and oriented and connected to said engine cooling system and said fuel supply line such that the engine coolant fluid passing through said exchanger plate assembly flows counter to the direction of flow of gas passing through said second compartment.

6. The system of claim 5 wherein said exchanger plate is generally rectangular, and wherein said first and second compartments extend generally rectangularly around the outer area of said exchanger plate, exteriorly of said opening means.

7. The system of claim 6 wherein said inlet and outlet means of said first compartment is disposed along one edge of said exchanger plate assembly, and wherein said inlet and outlet means of said second compartment is disposed on opposite edges of said exchanger plate adjacent the edge having said inlet and outlet means of said first compartment.

8. The system of claim 1 wherein said exchanger plate assembly includes a top cover plate, a main exchanger plate secured below said cover plate and wherein at least one of said compartments is formed about the top portion of said main exchanger plate adjacent said cover plate; and a third lower plate secured to the bottom of said main exchanger plate and wherein said third lower plate has said baffle means disposed therein.

9. The system of claim 8 wherein said means for mounting said plurality of baffles in order that they may vibrate includes a plurality of slots with each baffle being supported about opposite ends therein such that the same may freely move therein.

* * * * *